(12) United States Patent
Baeckler et al.

(10) Patent No.: US 8,001,499 B1
(45) Date of Patent: Aug. 16, 2011

(54) CIRCUIT TYPE PRAGMA FOR COMPUTER AIDED DESIGN TOOLS

(75) Inventors: Greg William Baeckler, San Jose, CA (US); David W. Mendel, Sunnyvale, CA (US); Michael D. Hutton, Mountain View, CA (US)

(73) Assignee: Altera Corporation, San Jose, CA (US)

( * ) Notice: Subject to any disclaimer, the term of this patent is extended or adjusted under 35 U.S.C. 154(b) by 709 days.

(21) Appl. No.: 12/053,481

(22) Filed: Mar. 21, 2008

(51) Int. Cl.
*G06F 17/50* (2006.01)
(52) U.S. Cl. .................. 716/104; 716/101; 716/136
(58) Field of Classification Search .................. 716/101, 716/104, 136
See application file for complete search history.

(56) References Cited

U.S. PATENT DOCUMENTS

2005/0149898 A1* 7/2005 Hakewill et al. ................ 716/18
* cited by examiner

*Primary Examiner* — Thuan Do
(74) *Attorney, Agent, or Firm* — Martine Penilla & Gencarella, LLP

(57) ABSTRACT

A pragma is used to pass circuit type information to a Computer Aided design (CAD) tool. The CAD tool then selects an alternate synthesis or timing algorithm based on the circuit type, and a circuit design for use in an electronic device is created. Practical applications include using alternate algorithms specific to different circuit types, such as, Cyclic Redundancy Checks (CRC), bus arbiters, state machine encoders, barrel shifters, preferential cores, and legacy circuits. One embodiment generates informative messages for the designer once the circuit type is known and the analysis is performed. Another embodiment generates pragmas that can be later used by circuit designers in future circuit designs.

26 Claims, 9 Drawing Sheets

| | Total | Incr | RF | Type | Fanout | Location | Element |
|---|---|---|---|---|---|---|---|
| 1 | 0.000 | 0.000 | | | | | launch edge time |
| 2 | 2.569 | 2.569 | R | | | | clock network delay |
| 3 | 2.723 | 0.154 | | uTco | 1 | DSPOUT_X26_Y2_N2 | ...out1~DATAOUT6 |
| 4 | 3.155 | 0.432 | RR | CELL | 1 | DSPOUT_X26_Y2_N2 | ...mac_out1\|dataout[6] |
| 5 | 3.155 | 0.000 | | RE | 29 | DSPOUT_X26_Y2_N2 | TITAN_MAC_OUT |
| 6 | 3.214 | 0.059 | | RE | 1 | DSP_BUFFER_X26_Y3_N0_I11 | MAC_BUFFER |
| 7 | 3.390 | 0.176 | | RE | 1 | C4_X26_Y4_N0_I16 | V_SEG4 |
| 8 | 3.566 | 0.176 | | RE | 1 | LOCAL_INTERCONNECT_X27_Y4_N0_I47 | LAB_LINE |
| 9 | 3.566 | 0.000 | RR | IC | 2 | MLABCELL_X27_Y4_N12 | ...sub_cella[6]\|datab |
| 10 | 4.115 | 0.549 | RR | CELL | 1 | MLABCELL_X27_Y4_N12 | ...d_sub_cella[6]\|cout |
| 11 | 4.115 | 0.000 | | RE | 4 | MLABCELL_X27_Y4_N12 | ...TAN_LCELL_COMB |
| 12 | 4.132 | 0.017 | RR | IC | 2 | MLABCELL_X27_Y4_N14 | ...add_sub_cella[7]\|cin |
| 13 | 4.132 | 0.000 | RR | CELL | 1 | MLABCELL_X27_Y4_N14 | ...d_sub_cella[7]\|cout |
| 14 | 4.132 | 0.000 | | RE | 4 | MLABCELL_X27_Y4_N14 | ...TAN_LCELL_COMB |
| 15 | 4.149 | 0.017 | RR | IC | 2 | MLABCELL_X27_Y4_N16 | ...add_sub_cella[8]\|cin |
| 16 | 4.149 | 0.000 | RR | CELL | 1 | MLABCELL_X27_Y4_N16 | ...d_sub_cella[8]\|cout |

Fig. 4E

CIRCUIT TYPE PRAGMA FOR COMPUTER AIDED DESIGN TOOLS

BACKGROUND

Programmable logic systems, as well as other circuit designs, are often created with the help of Computer Aided Design (CAD) tools. Typically, a designer creates a Hardware Description Language (HDL) design file, sometimes called a Verilog HDL file, with instructions for the circuit functionality. The CAD tool creates a circuit description after several steps that can be described at a high level as synthesis, place & route, timing analysis, and simulation. The result is a binary file with instructions for programming and configuration of the programmable logic system. An example of a commercially available CAD tool is QUARTUS™ II available from the assignee.

During synthesis, the HDL chip description is translated into a basic discrete netlist of logic-gate primitives followed by the optimization of the basic netlist. Synthesis uses a series of algorithms that minimize the number of technology cells and optimize the signal speed through the technology cell paths. Many different synthesis algorithms are available, but the synthesis tool design engineer must often discard some of these algorithms because of long processing time requirements or because they are only useful in a small percentage of circuits. Runtime is an important factor when selecting algorithms because circuit designers are hampered by short time constraints. This tradeoff between quality and runtime must be considered when selecting the algorithms to be used during synthesis.

In addition to requiring long runtimes or lacking utility for most circuits, many available beneficial synthesis algorithms are discarded because they take a long time to detect the circuit type, or because there is not enough information in the HDL source code to determine with certainty the type of circuit. If the synthesis tool had information on the type of circuit desired, it would be possible to use circuit-specific synthesis algorithms that provide substantial improvements with low runtime overhead.

In some circuit designs, the CAD will detect timing problems that may render a programmable device not useful for an intended purpose, such as for supporting Input/Output (I/O) operations at desired speeds. If the programmable device has been binned at a lower speed than the actual speed supported by the device, the programmable device may still be able to support such operations if the timing analysis could be fine tuned.

Therefore, there is a need to quickly identify circuit types in HDL code so the synthesis process can eliminate circuit identification processing as well as take advantage of more efficient algorithms, resulting in improved circuit area, circuit speed, and design tool runtime. Additionally, there is a need to better control timing analysis for programmable devices.

SUMMARY

Embodiments of the present invention provide a method, program instructions on a computer readable medium, and a computer implemented system for optimizing circuit design in a circuit design tool. It should be appreciated that the present invention can be implemented in numerous ways, such as a process, an apparatus, a system, a device or a method on a computer readable medium. Several inventive embodiments of the present invention are described below.

Broadly speaking, pragmas (short for pragmatic information) refer to directives for compilers or software tools embedded in a program's source code that guide the behavior of the compiler or software tool. Pragmas differ from actual program instructions in the sense that the pragmas affect the behavior of the processing software, but they are not actual software or hardware instructions. In one embodiment, a pragma included in an HDL source file is detected and then an alternate synthesis or timing algorithm is applied depending on the circuit type defined in the pragma. The alternate algorithm generates a circuit design for use in an electronic device.

Practical applications to which the embodiments described herein may be applied include using alternate algorithms for optimization of different circuit types such as Cyclic Redundancy Checks (CRC), bus arbiters, state machine encoders, barrel shifters, preferential core, and legacy circuits. One embodiment generates informative messages for the designer once the circuit type is known, such as unused lines or undesired results for this type of circuit. Another embodiment generates pragmas that can be later used by circuit designers in future circuit designs.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 4E shows a sample timing report done by a timing analysis tool.

DETAILED DESCRIPTION

HDL circuit designs are composed of smaller building blocks, sometimes referred to as modules, subs, subdesigns, etc. These subdesigns are often repeated reflecting smaller self-contained circuits. Well known synthesis methods exist for recognizing a wide variety of commonly occurring circuit structures, but they require long runtimes, thereby becoming impractical in real life, especially when restrictive time constraints eliminates synthesis methods having long runtimes.

A pragma is used to pass circuit type information to a Computer Aided Design (CAD) tool in the embodiments described herein. In some cases, additional parameters are included in the pragma to further define the details of the circuit desired. The CAD tool selects an alternate algorithm based on the circuit type found in the pragma, and the alternate algorithm generates a circuit design for use in an electronic device. Practical applications include using alternate algorithms specific to different circuit types such as Cyclic Redundancy Checks (CRC), bus arbiters, state machine encoders, barrel shifters, preferential core, and legacy circuits. In one embodiment informative messages are generated for the designer once the circuit type is known and the synthesis is performed. For example, if the design requests a bus arbiter with a certain number of request lines, but the synthesis tool determines that not all bus request lines are being used, then a warning message is output indicating the condition. The warnings can be communicated to the designer via display, text file, printer, email, etc.

Another embodiment generates pragmas that can be later used by circuit designers in future circuit designs. In this manner, future runs of the CAD tool will benefit from the partial results obtained by the synthesis tool in the current run. An example of a commercially available CAD tool is QUARTUS™ II from the assignee. The teachings in this application are not limited to applications within the QUARTUS™ tool, and any CAD or electronic design automation tool can benefit from the embodiments described in this application.

The following embodiments describe a method, program instructions on a computer readable medium, and a computer implemented system for optimizing circuit design in a circuit design tool by using pragmas. It will be obvious, however, to one skilled in the art, that the present invention may be practiced without some or all of these specific details. In other instances, well known process operations have not been described in detail in order not to unnecessarily obscure the present invention.

Figure 1:
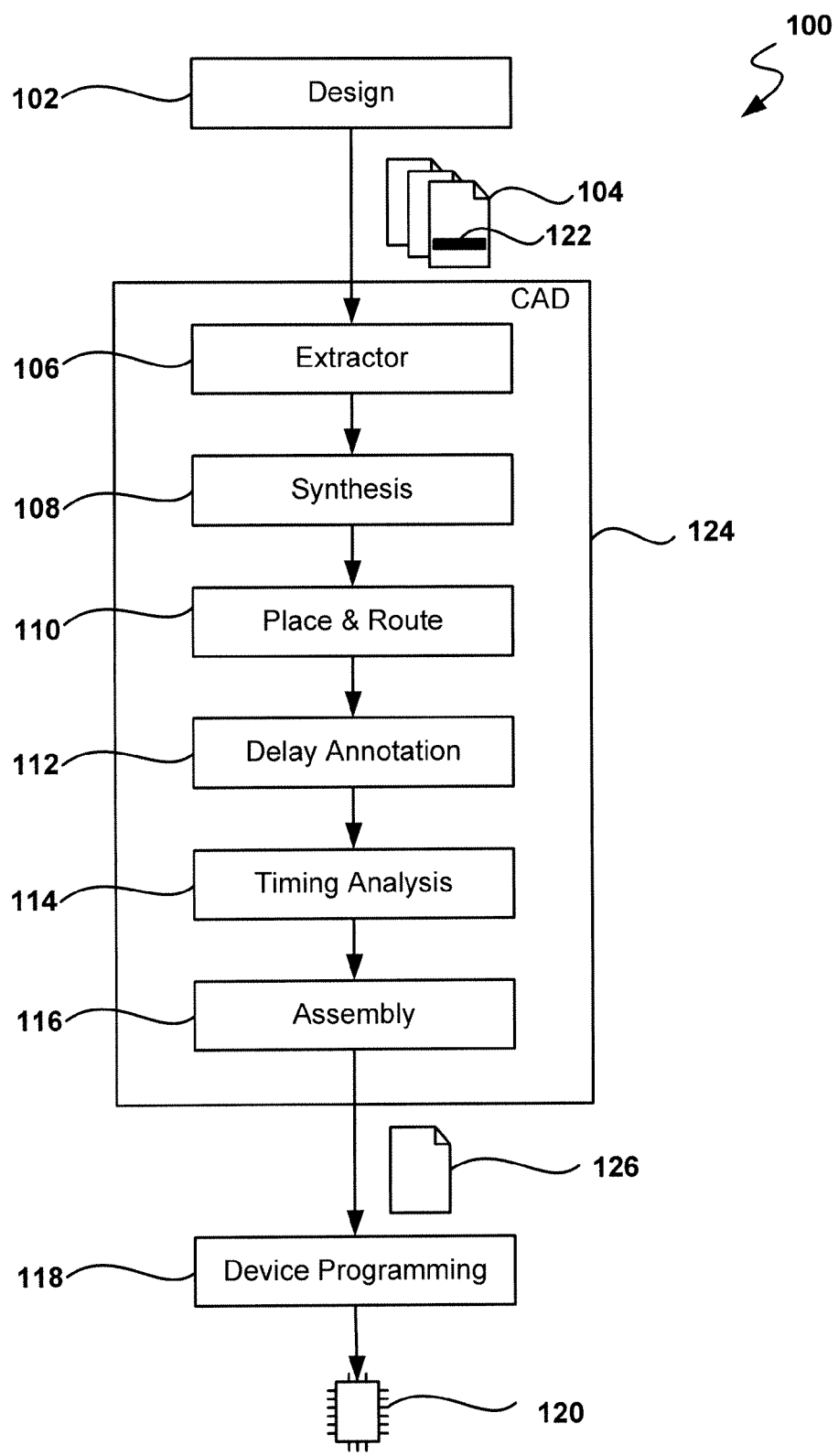
FIG. 1 depicts the method operations required to program a typical programmable logic system using a Computer Aided Design (CAD) tool in accordance with one embodiment of the invention.

FIG. 1 depicts the method operations required to program a typical programmable logic system using a Computer Aided Design (CAD) tool 124. The process starts with design 102 produced by a hardware engineer that creates HDL files 104 containing the desired circuitry description. Initially, extractor 106 parses HDL files 104 and creates a basic discrete netlist of logic-gate primitives, followed by synthesis 108 phase that optimizes the basic netlist. Synthesis is typically divided into phases and steps within the phases. At any point in time, the circuit representation is complete, self-contained and equivalent to the HDL design. Most steps are optional, in the sense that the step's removal will not stop CAD tool 124 from reaching a solution, however the solution quality may be impacted from removal of the optional steps.

The sequence of steps is designed for a typical user, that is, one size fits all. Synthesis design engineers must trade off goals when selecting synthesis algorithms to run. Firstly, the desired solution must have a small area thereby requiring minimizing the number of technology cells used resulting in a less costly electronic device. Secondly, the speed of the resulting circuit needs to satisfy the user timing constraints. Finally, the runtime of the synthesis tool must be long enough to produce acceptable solutions, but not so long as to be non-productive for the hardware engineer awaiting a solution. For example, a reasonable amount of time for synthesis in current designs is about one hour, but can increase to several days depending on requirements.

Most steps are heuristic, i.e., designed to make good guesses quickly. Finding perfect solutions may be achievable but at the expense of an unacceptable runtime. It is common for synthesis software engineers to reject new algorithm steps based exclusively on runtime requirements, such as algorithms applicable only to certain subcircuits and that require a long subcircuit identification time, or algorithms that only benefit a very small subset of circuit types.

Pragma 122 is embedded in HDL file 104 to indicate the circuit type for the subcircuit described by pragma 122. Optionally, other parameters can be included with the circuit type to further convey to the synthesis tool the purpose of the subcircuit. Examples of additional pragma parameters include variable names associated with block input and output signals, polynomials associated with error correction or detection schemes such as CRC, Error Correcting Code (ECC), or Reed Solomon coders, and intended widths of multiple bit signals within a circuit block. In one embodiment, pragmas are included in HDL file 104 as a comment, for example:

/* synthesis circuit_type=MUX */

The advantage of including the pragma as a comment is that synthesis 108 will ignore the directive if the pragma is not understood. This allows portability of the source code to other CAD tools that do not recognize pragmas, because other CAD tools will consider the unrecognized directive a comment and ignore the pragma. Once synthesis 108 recognizes pragma 122, synthesis 108 will use an alternate algorithm to optimize the subcircuit associated with pragma 122. Improvements include saving the time required to recognize the subcircuit type, applying specific algorithms that benefit the desired circuitry, and using prefabricated optimized solutions available for the circuit type. The use of circuit-type pragmas enables compile-runtime improvements that would not be available otherwise. In another embodiment, a plurality of synthesis algorithms are available for a given circuit type, and the designer can select one of these algorithms to be used in the synthesis phase by specifying the algorithm desired in the pragma. Synthesis 108 is now able to output intelligent warning messages to the circuit designer if the actual circuitry differs from the stated intent in pragma 122. This is a valuable debugging advantage for optimizing circuit designs.

As discussed supra, pragmas can be embedded in an HDL source file. Those skilled in the art will appreciate other mechanisms to provide the circuit type information pragma to the synthesis tool, such as storing the pragma in an external file with annotations that indicate the source file and line number or name of the applicable subcircuit. In another embodiment, the circuit type information can be stored in existing node assignment mechanisms, such as for example in a QUARTUS™ "QSF" file. Synthesis optimization can be further improved by using additional parameters in the pragma that improve the definition of the circuit desired. For example, the additional parameters can be inserted within the pragma following the circuit type definition.

Going back to FIG. 1, place and route 110 and assembly 116 operations follow synthesis 108. After place and route 110, delay annotation 112 assigns delays to the different gates and wires in the circuit. Timing analysis computes the lengths of paths in the circuits and how the delays relate to the constraints of the circuit. As a result, CAD tool 124 produces binary file 126 with a description of the circuit to be used during device programming 118 of electronic device 120. The resulting binary file 126 can be stored in non-volatile memory for later retrieval by the device programming process 118.

Figure 2A:
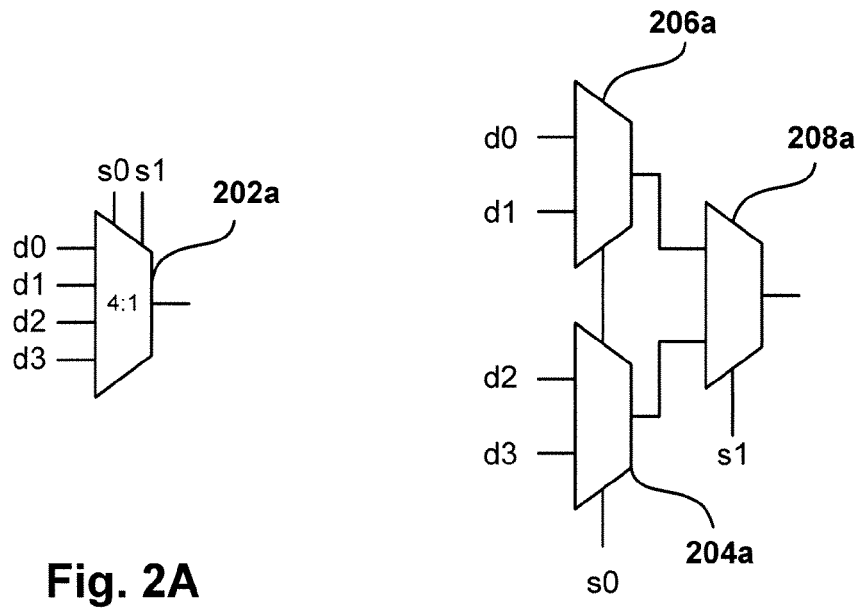
FIG. 2A shows one implementation of a 4:1 multiplexer using three 2:1 multiplexers.
Figure 2B:
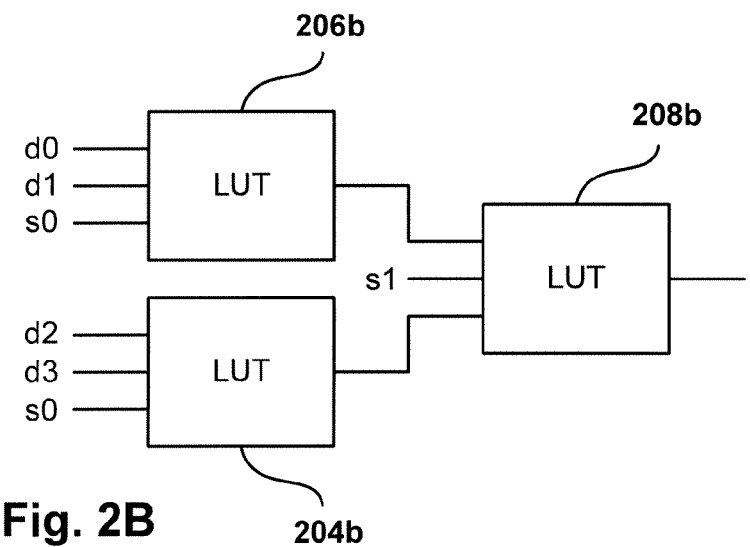
FIG. 2B shows one implementation of the multiplexers described in FIG. 2A by using Look Up Tables.
Figure 2C:
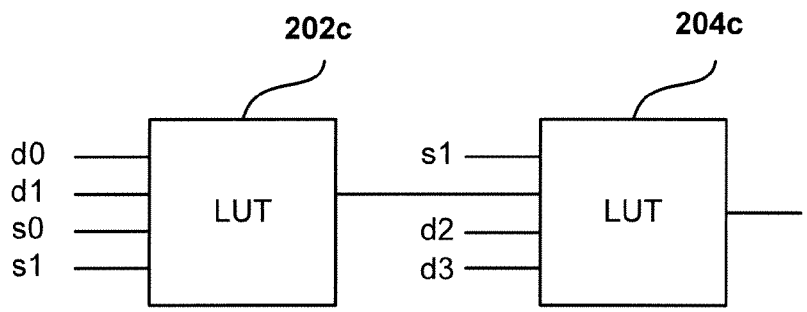
FIG. 2C shows the 4:1 multiplexer of FIG. 2A implemented with two 4-input LUTs in accordance with one embodiment.

FIGS. 2A to 2C describe possible implementations for a 4:1 Multiplexer (MUX). This example will help understand how a pragma can improve the synthesis process, and more specifically, how using additional parameters can further help synthesis. FIG. 2A shows an implementation of 4:1 multiplexer 202*a* using three 2:1 multiplexers. The 4:1 multiplexer can be implemented using three basic 2:1 Multiplexers 204*a*, 206*a* and 208*a*. Multiplexer 206*a* selects d0 or d1 according to select input s0. Multiplexer 204*a* also uses select input s0 to select from d2 or d3. Finally, multiplexer 208*a* selects one of the outputs from multiplexers 204*a* and 206*a* using select input s1.

FIG. 2B shows an implementation of the multiplexers described in FIG. 2A by using Look Up Tables (LUT) 204*b*, 206*b*, and 208*b* to implement multiplexers 204*a*, 206*a*, and 208*a* respectively of FIG. 2A. However, if the synthesis tool knew with certainty that it is a 4:1 multiplexer, the tool could produce a better configuration than the one shown in FIG. 2B. FIG. 2C shows the 4:1 multiplexer of FIG. 2A implemented with two 4-input LUTs, instead of three 3-input LUTs. The synthesis tool can exploit "functional factoring" techniques that can be used because it is known that the circuit is a multiplexer. During synthesis it is not always possible to determine with certainty the functions of the different lines and the boundaries for a given circuit. Even if it is known that the circuit type is a multiplexer from a pragma, it may be difficult to determine the lines and size of the multiplexer. For example, if a select input is fed by an AND gate, it may be unclear if the AND gate is part or not of the multiplexer logic. In some cases, designating the size of the circuit in the pragma enables the synthesis tool to avoid a potential problem where the synthesis tool recognizes a section of the intended logic, but not the full extent.

Below is an example of a portion of an HDL source file:
module test (dat, sel, out);
input [3:0] dat;
input [1:0] sel;
output out;
wire x,y;
/* synthesis circuit_type=MUX; data=dat; select=sel; */assign
assign x=sel[0] ? dat[1]: dat[0];
assign y=sel[0] ? dat[3]: dat[2];
assign out=sel[1] ? y: x;
endmodule Without the pragma, the CAD tool has a dilemma given that "out" is a MUX. The tool may be dealing with a 2:1 multiplexer with x and y as data; a 4:1 multiplexer with dat[4] as data; a 3:1 multiplexer with x, dat2 and dat3; or a 3:1 multiplexer with dat0, dat1 and y. The pragma makes it clear that the array dat is the data, and that the array sel contains the select signals. Now the synthesis tool has the required information and can produce an optimized solution as the one depicted in FIG. 2C with two 4-input LUTs.

In another embodiment, the circuit type in the pragma is for a bus arbiter. A typical bus arbiter accepts n requests lines and generates n grant lines. In most cases, there are also either n or log(n) additional inputs used to implement a fairness scheme. A typical range for n is from 16 to 32, but other values are also acceptable. An exemplary pragma follows:
/* synthesis circuit_type=arbiter; request=pci_request; grant=dev_select; size=16; */

It should be noted that pci_request and dev_select are variables appearing below the pragma. The additional information allows the synthesis tool to quickly confirm that the logic is for a bus arbiter, and there is no need to spend time analyzing signal behavior. A side effect is that the CAD tool can issue intelligent warnings for the user, in case mistakes are detected, such as for example detecting that only 13 of the 16 lines are being utilized. Without the circuit type pragma, this could be interpreted as the user's intent, and not as a design flaw.

Figure 3:
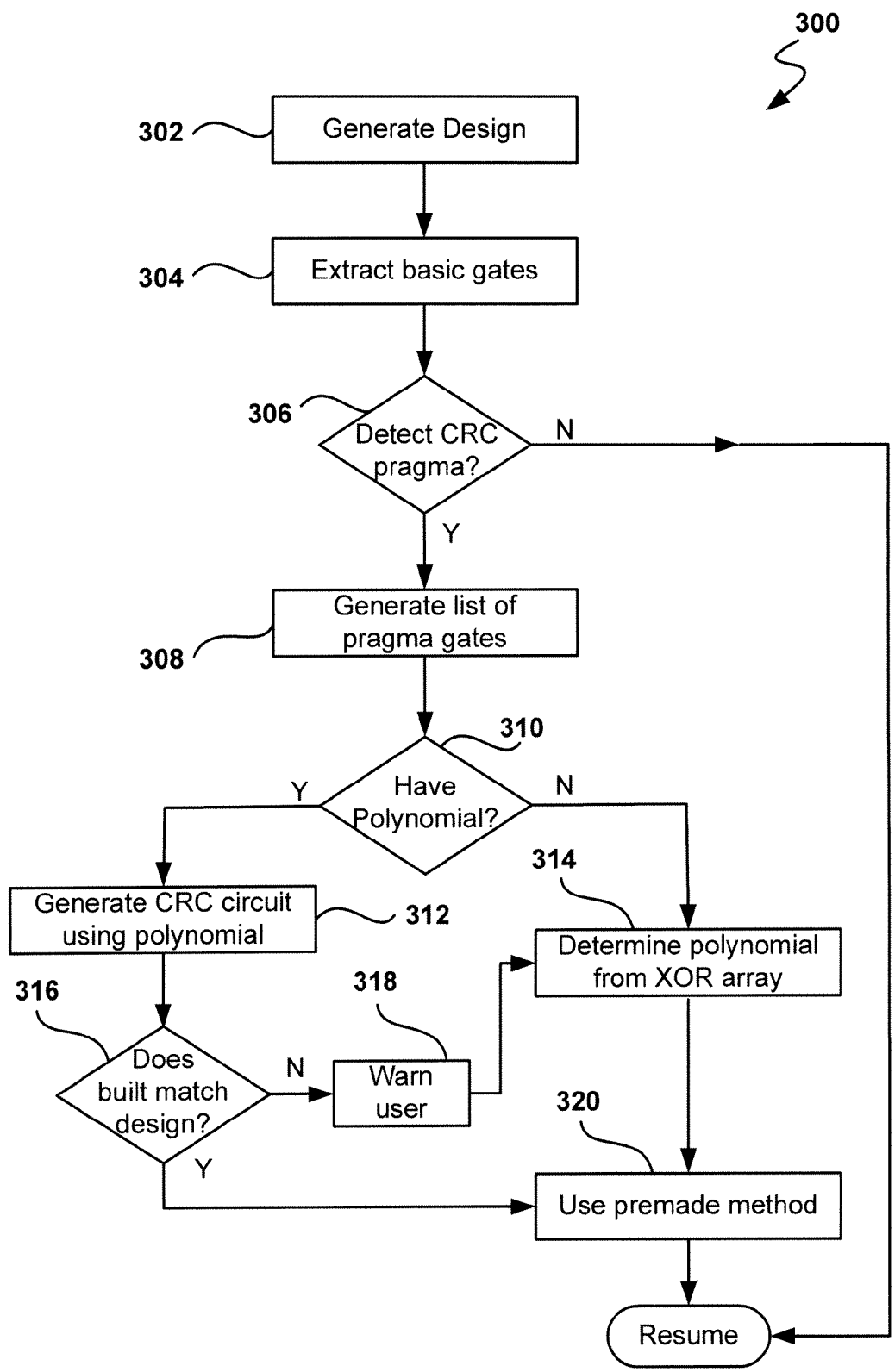
FIG. 3 shows a flow chart diagram of an alternate algorithm for a CRC circuit in accordance with one embodiment of the invention.

FIG. 3 shows a flow chart diagram of an alternate algorithm for a CRC circuit in accordance with one embodiment of the invention. An optimization algorithm for CRC circuits is described in detailed in patent application Ser. No. 11/403,342 titled "Methods and Apparatus for Error Checking Code Decomposition," which is incorporated herein by reference. Cyclic Redundancy Checks (CRC) are usually implemented in HDL as large arrays of XOR gates. There is a great number of possible topologies and several are commonly used. CRC arrays have a specific functional pattern that can greatly benefit from cancellation factoring, which is a very time consuming process. Other types of XOR arrays receive little benefit from this technique, and a relatively long time is required to confirm that an XOR array is a CRC XOR array. By adding the CRC pragma to the HDL source code, the synthesis tool can take advantage of this technique, as well as other techniques described herein.

In operation 302 a design is created and formalized in an HDL source file. In operation 304, the basic gates are extracted from the design. Upon detecting a CRC pragma in operation 306, a list of pragma gates are generated in operation 308. If the pragma provides a polynomial associated by the CRC then the algorithm proceeds to operation 312 where a CRC circuit is generated using the polynomial. Below is an example of a CRC pragma with a polynomial of 0x1004d, with dat are the data lines and crcs are the lines for the CRC bits:
/* synthesis circuit type=CRC; poly=0x1004d; data=dat; crc_bits=crcs */

The generated CRC circuit is checked in operation 316 to see if the generated CRC circuit matches the intended design. If the generated CRC circuit matches the design, then a premade method is used in operation 320 to generate the CRC circuit. The premade method can be a different algorithm for optimization of the circuit design according to the parameters in the pragma, or can be part of a library of precompiled optimized solutions available for use during synthesis. The precompiled optimized solutions are better because there is virtually unlimited runtime available at the factory.

If the pragma does not include a polynomial as determined in operation 306, then a polynomial is calculated from the XOR array in operation 314. Also, if the generated CRC circuit with the polynomial fails to meet the spec, as seen in operation 316, then a warning is outputted for the user and the method proceeds to operation 314, as described above. Finally, after the polynomial is calculated from the XOR gates in operation 314, operation 320 makes use of the premade method.

The circuit type pragma can be used in many other types of circuits. A few are described here, but the list is not intended to be exhaustive and the person skilled in the art will realize the potential for improvements in many other types of circuits. In the case of a circuit for a state-machine recognition, there are well known methods for analyzing registers as state machines. Currently, synthesis may rely on the HDL coding style for identification, but this approach is not robust and too much time is required to check all registers in the design for determining the state transition behavior.

In the case of a circuit for barrel shifter recognition, identifying the series of multiplexers that implement the barrel shifter is very time consuming, especially because very often individual multiplexers have slight variations that thwart recognition. With a pragma identifying the barrel shifter, methods to repair the multiplexers can be used to produce optimized barrel shifters.

In many circuit designs, it is important to maintain the circuits designed in the past to have consistency with previously designed circuits. In this legacy design scenario, old library circuits sometimes contain special buffer types or use obsolete design practices which are not optimally addressed by modern CAD tools. By using a pragma indicating that this is a legacy circuit, the CAD tool can then regress to a behavior from a previous version of the tool.

In another embodiment, a synthesis profiling tool analyzes subdesigns to create pragmas that can be later used in subsequent compilations. If a user could afford a large runtime, for example a few days, a software 'profiling' tool could systematically compile subdesigns and compare the resulting logic against common circuit types. The profiler could then modify the source code directly or save the information in a separate file. Subsequent compiles would immediately derive the speed or area benefit of the discovered pragma without the long runtime required. In some cases the profiling tool can consider the tradeoffs between speed, area and runtime. In other cases, the profiler can accept user input to determine the tradeoff ratios. For example, a ten percent runtime decrease for a one percent speed degradation may be acceptable in some instances.

Speed binning is the process that assigns a performance category to a programmable device. Typically, users choose those devices that meet their speed requirements without having to pay more for devices that deliver unnecessary extra performance. During manufacturing, a particular device may be "binned" at a lower performance rate than otherwise possible for that device. Some of the reasons include a higher demand for a particular kind of chip, desire by the manufacturer to offer more choices to customers, lower manufacturing costs, etc. As a result, a device may have the potential to run faster than the performance stamp received by the device. However, this lower performance attributed to the device may result in situations where the circuit design tool determines that a device is not fit for a specific purpose, when the device is in fact capable of delivering the required performance.

This is particularly critical for certain functions of the programmable device, such is I/O functions, which are performed by the IP core of the programmable device. Some of these IP cores support different interfaces, such as Peripheral Component Interconnect (PCI) Express interface, Double Data Rate (DDR) memory controller, Serial RapidIO interface, Ethernet Media Access Control (MAC) interface, Interlaken, etc. The use of a pragma to identify some of these critical IP cores would enable the circuit design tool to change the timing algorithm employed in the analysis of the identified cores to use the actual performance metrics actually supported by the device only in the identified cores, instead of using the performance metrics associated with the binning of the device. As a result, these devices are able to support these interfaces associated with the IP cores without having to redesign the IP cores to support the required speeds, while delivering the user performance that corresponds to the device.

Figure 4A:
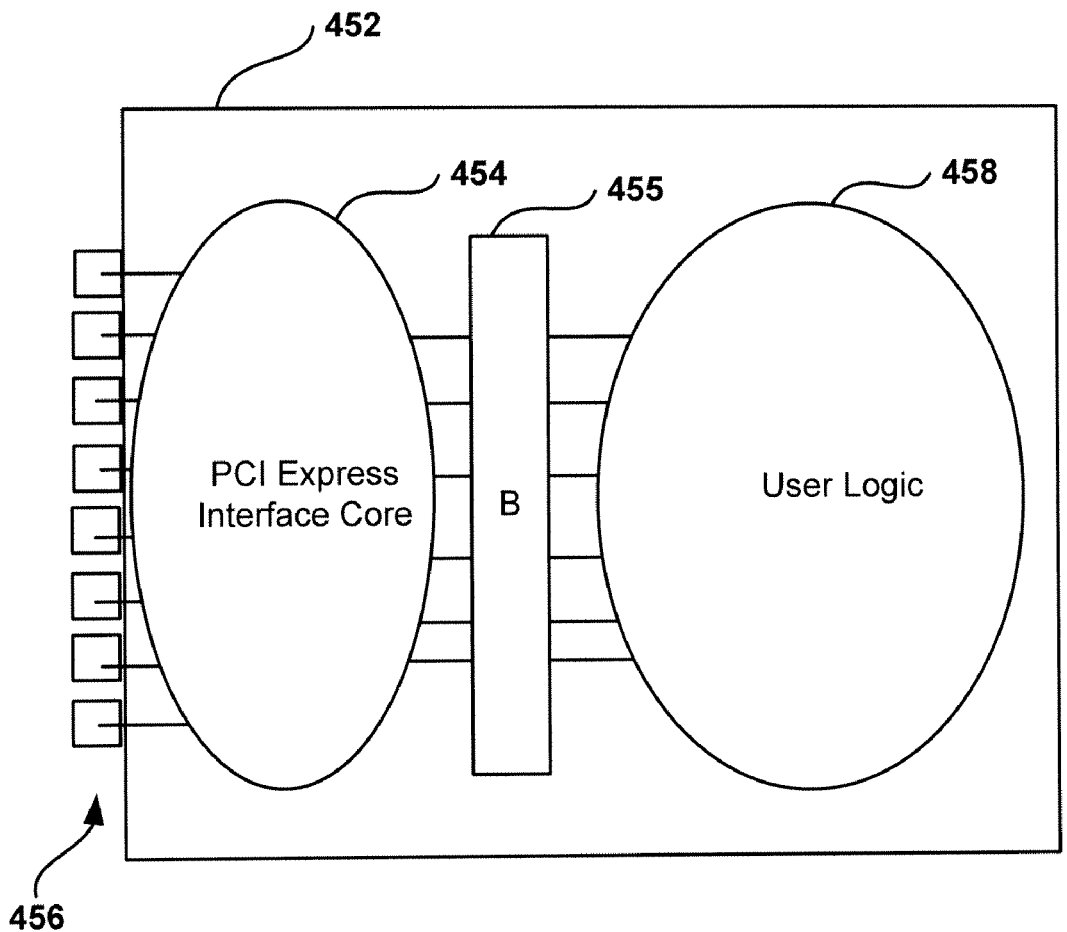
FIG. 4A shows an FPGA with a preferential PCI Express interface core circuit.

FIG. 4A shows an FPGA with a preferential PCI Express interface core circuit. FPGA 452 includes PCI Express Interface Core 454 that manages I/O 456 and then presents the data to user logic 458 in the FPGA. The PCI Express Interface core can benefit from preferential timing analysis in order to meet the I/O speeds required for the PCI Express interface.

Figure 4B:
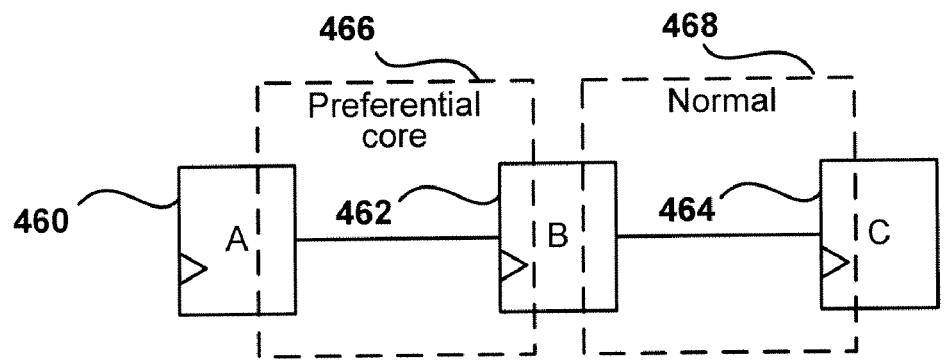
FIG. 4B describes communications between registers under preferential and normal timing conditions.

FIG. 4B describes communications between registers under preferential and normal timing conditions. In this embodiment, preferential core 466 includes the communications between register A 460 and B 462. On the other hand, the communications between register B 466 and C 464 are under normal 468 timing constraints. This is a generic representation and for the embodiment described in FIG. 4A, register A 460 is be part of PCI Express Interface Core 454, register B 455 is between Core 454 and user logic 458, and register C 468 is part of user logic 458.

Figure 4C:
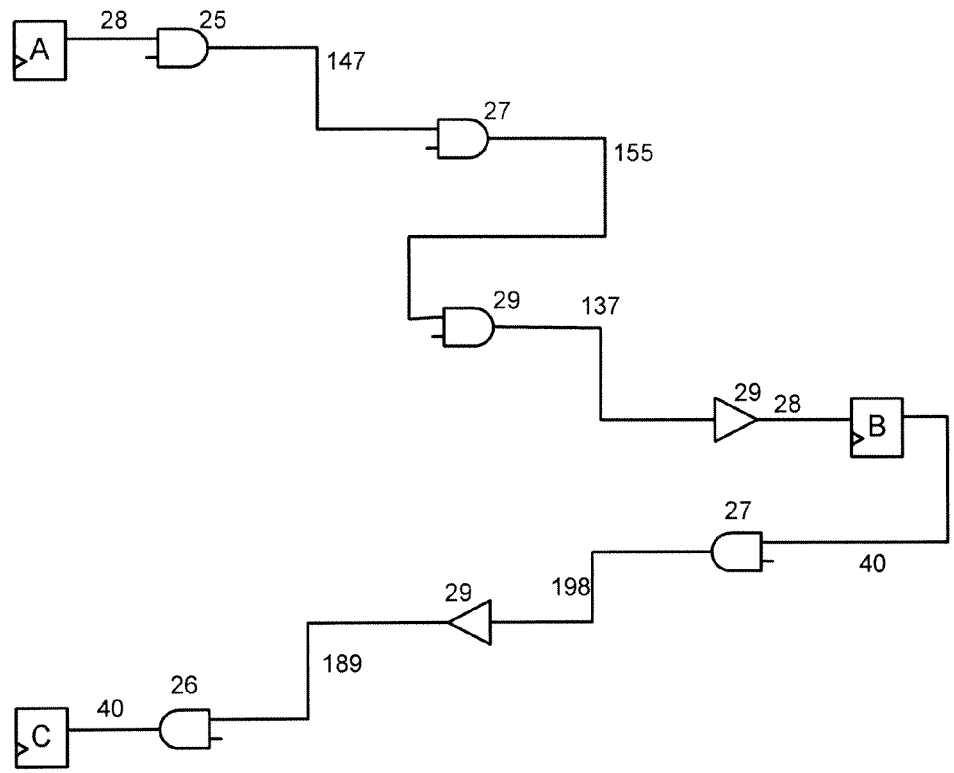
FIG. 4C describes delays between registers under normal timing conditions.

FIG. 4C describes delays between registers under normal timing conditions. The numbers in FIG. 4C describe the delays in picoseconds calculated by the circuit design tool associated with the different gates and wires under normal conditions, that is, using the delays associated with the level of performance attributed to the device.

Figure 4D:
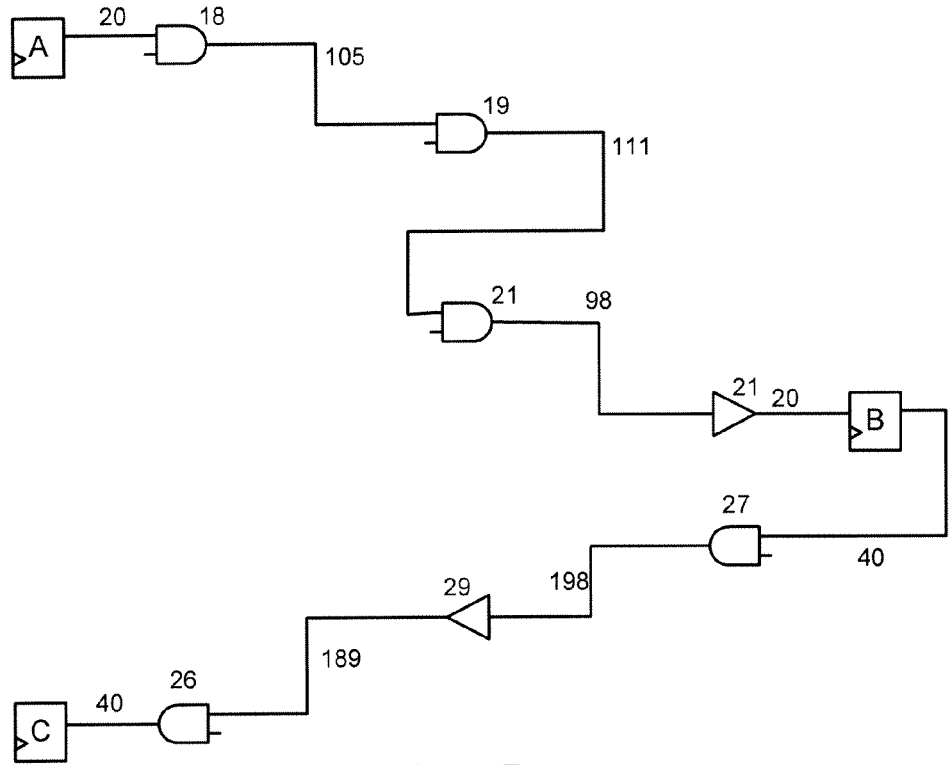
FIG. 4D shows delays between two registers belonging to a preferential core circuit.

FIG. 4D shows delays between two registers belonging to a preferential core circuit. FIG. 4D shows the effects of using a pragma to establish that the communication between register A and register B is part of a preferential core, while the communication between register B and register C is not part of a preferential core. As a result, the delays between A and B are lower than those calculated with respect to FIG. 4C, and are indicative of the true performance potential of the device. Comparing the delays between FIG. 4C and FIG. 4D, the delays between A and B are lower in FIG. 4D: 28 to 20, 25 to 18, 147 to 105, 27 to 19, etc. The delays between B and C stay the same since they are both calculated under normal operating conditions. Examples of pragmas to accomplish this are as follows:

/* timing circuit_type=preferential */, or

/* timing FAST_TIMING */

FIG. 4E shows a sample timing report done by a timing analysis tool. The report was generated by Quartus™ II TimeQuest™ Timing Analysis Tool from Altera Corporation. Shown in the left panel are the details of register to register paths, with each timing delay occupying one row. Row 490, for example, is row 7 of the table and describes the delay of a V4 (vertical length 4) wire segment in the device. In one embodiment, a pragma is used to make this delay in row 490 to be part of a preferential core and the device can deliver better performance causing the delay 494 of 0.176 ns to be lowered to 0.126 ns (not shown). In addition, the accumulated running total 492 of 3.390 ns would also be lower (not shown), thus improving the overall delay of the register to register path.

Figure 4F:
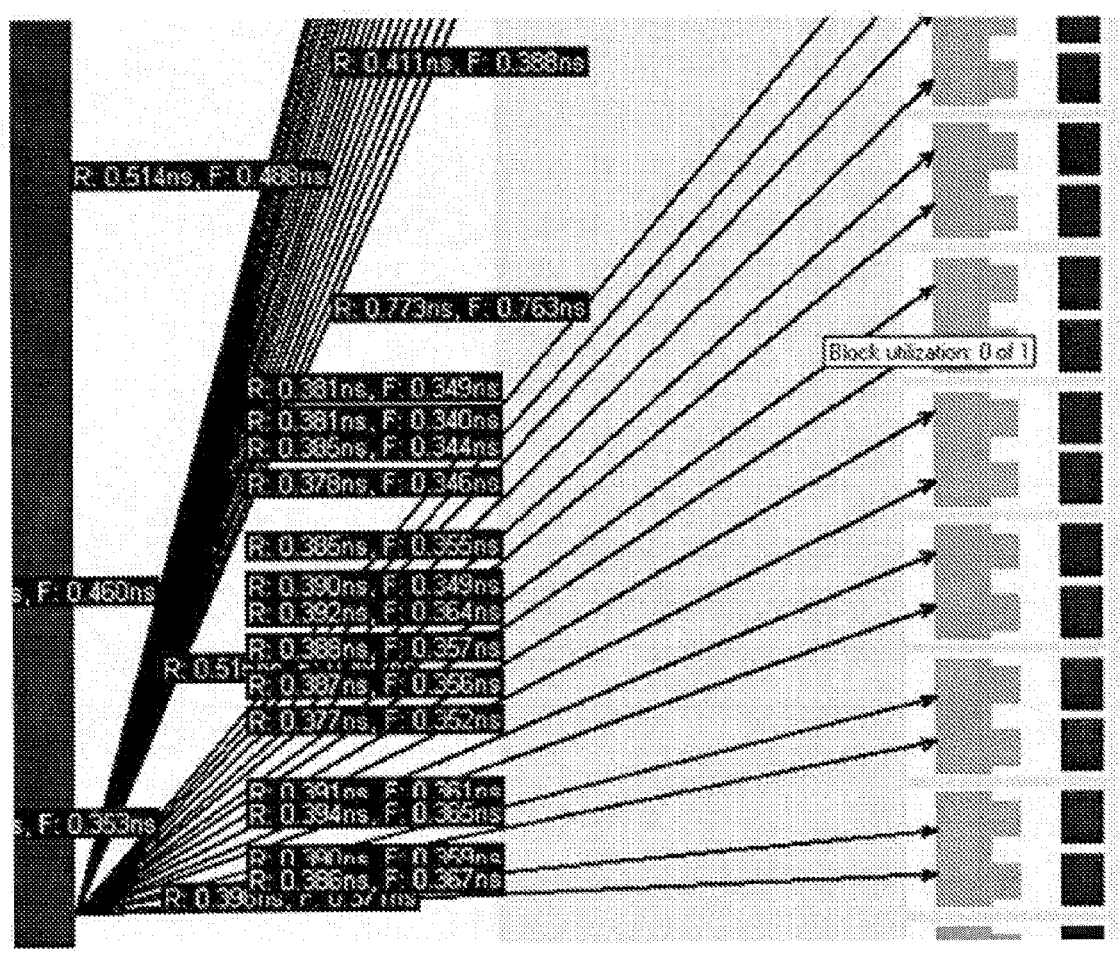
FIG. 4F shows an example of a graphical representation of delays from a node to its neighbors.

FIG. 4F shows an example of a graphical representation of delays from a node to its neighbors. This example provides a different timing report, a graphical chip-editor. In this zoomed view, the delays from an individual node placed in the chip to its fanout neighbors are shown, along with their delays. The delay of any of these wires or nodes would potentially be lowered when using a preferential core pragma.

In another embodiment, the concept of the pragma to lower delays between registers in preferential cores is extended to provide the ability to define different levels of performance in different parts of the programmable device. For example, if four levels of performance named normal, fast, faster and fastest are available, a pragma to select 'fast' mode is:

/* timing circuit_type=preferential level=fast */

Figure 5:
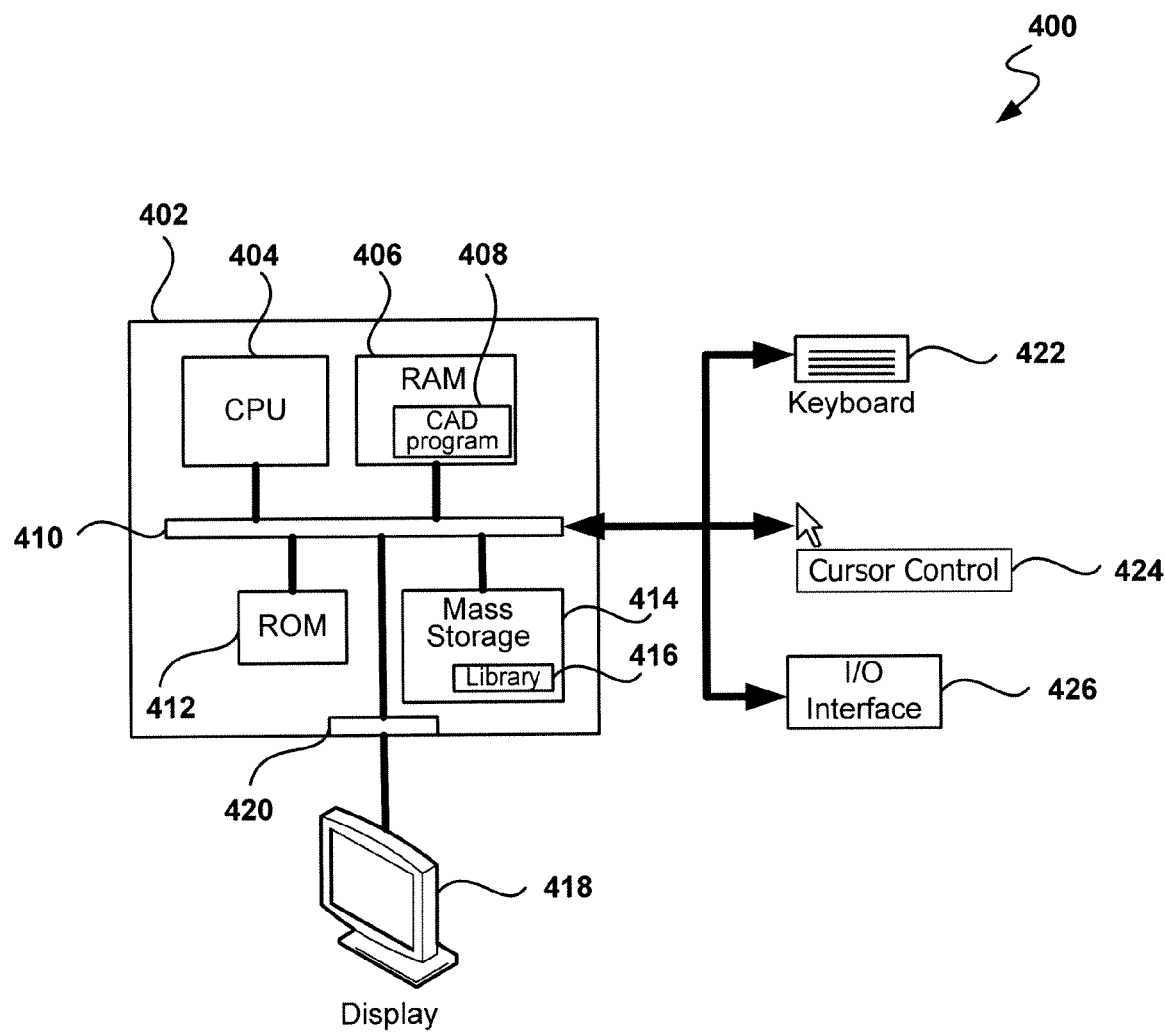
FIG. 5 is a simplified schematic diagram of a computer system for implementing embodiments of the present invention.

FIG. 5 is a simplified schematic diagram of computer system 400 for implementing embodiments of the present invention. It should be appreciated that the methods described herein may be performed with a digital processing system, such as a conventional, general-purpose computer system. Special purpose computers, which are designed or programmed to perform only one function may be used in the alternative. In addition, the computer system of FIG. 5 may be used to perform synthesis of a design that is described in a hardware description language. The computer system includes a central processing unit (CPU) 404, which is coupled through bus 410 to random access memory (RAM) 406, read-only memory (ROM) 412, and mass storage device 414. CAD program 408 resides in random access memory (RAM) 406. CAD program 408 may contain software that when executed by CPU 404 will cause CPU 404 to execute the functionality of FIGS. 3 and 6.

Mass storage device 414 represents a persistent data storage device such as a floppy disc drive or a fixed disc drive, which may be local or remote. Library 416 resides in mass storage device 414. Library 416 may contain program instructions for CAD tool 124 of FIG. 1, such as synthesis algorithms and premade methods. Library 416 may also contain source HDL files 104 and binary files 126 as seen in FIG. 1. It should be appreciated that CPU 404 may be embodied in a general-purpose processor, a special purpose processor, or a specially programmed logic device. Display 418 is in communication with CPU 404, RAM 406, ROM 412, and mass storage device 414, through bus 410 and display interface 420. Of course, display 418 is configured to display the user interfaces described herein. Keyboard 422, cursor control 424, and input/output interface 426 are coupled to bus 410 in order to communicate information in command selections to CPU 404. It should be appreciated that data to and from external devices may be communicated through input output interface 426. CPU 404 would execute the functionality described herein to enable a designer to temporarily store a functional element within the tray region.

Figure 6:
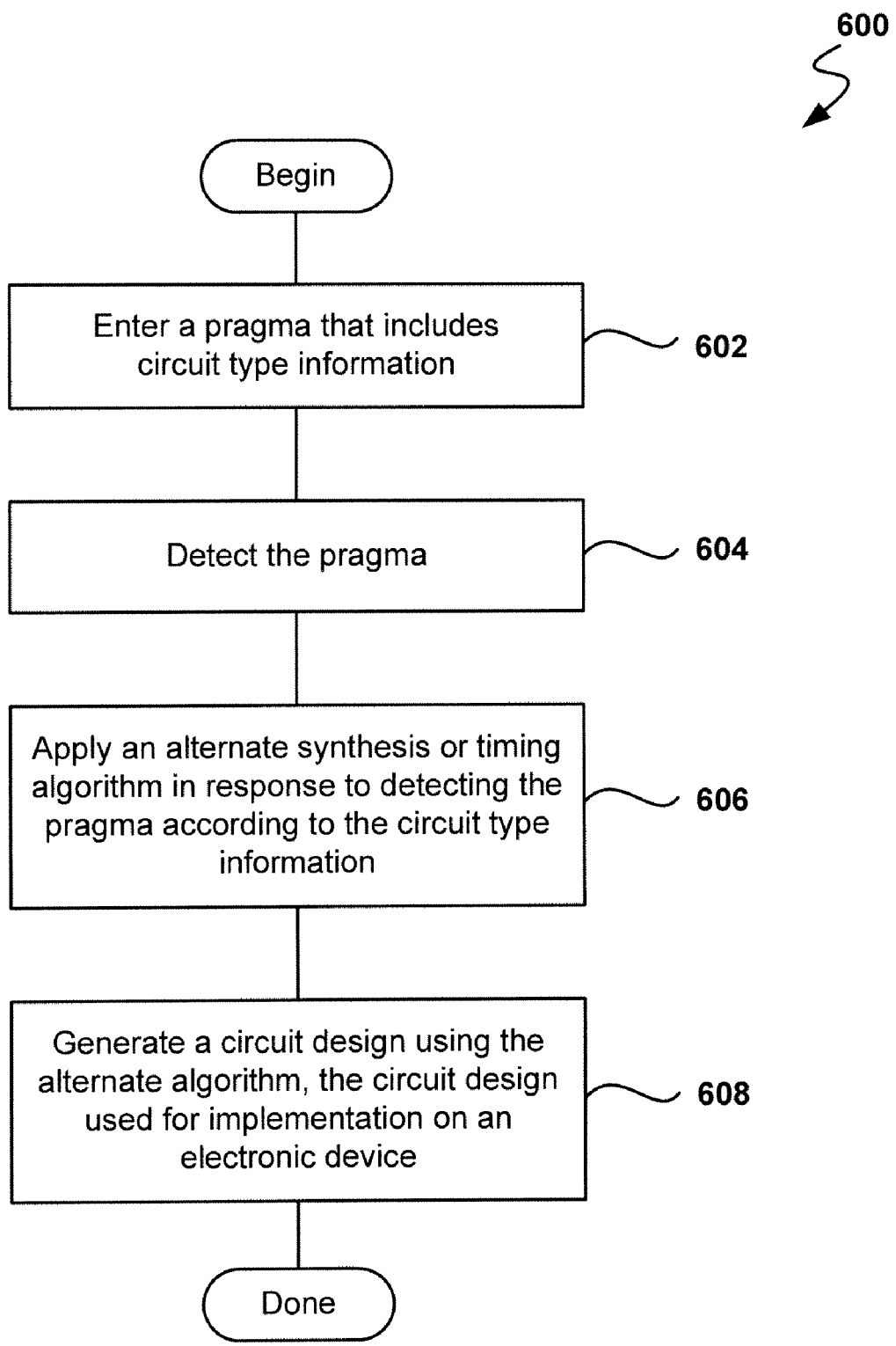
FIG. 6 shows the process flow for optimizing synthesis in a circuit design tool in accordance with one embodiment of the invention.

FIG. 6 shows and embodiment of process flow 600 for optimizing synthesis in a circuit design tool, in accordance with the current invention. As discussed above, the method uses a circuit type pragma to inform the CAD tool the type of circuit intended. At operation 602, a pragma is entered that includes circuit type information. The pragma can be embedded in the HDL source file created for the circuitry desired. In some cases, additional parameters for the given circuit type are included in the pragma.

At operation 604, the pragma is detected by the circuit design tool. For example, the extractor, that is part of the synthesis phase, detects the pragma while parsing the source files. At operation 606, an alternate synthesis or timing algorithm is used according to the circuit type, as a response to detecting the pragma. As discussed hereinabove, synthesis algorithms specially designed for certain circuit types can be used resulting in savings in space, area, or runtime. These synthesis algorithms may be pre-defined and/or stored within a library. Similarly, an alternate timing algorithm can be used to define a preferential core that has the potential to deliver better performance.

Finally, at operation 608, a circuit design is generated using the alternate algorithm. The resulting circuit design, described herein may be employed with any integrated circuit, such as processors, programmable logic devices (PLDs) and factory programmed devices. Exemplary PLDs include but are not limited to a programmable array logic (PAL), programmable logic array (PLA), field programmable logic array (FPLA), electrically programmable logic devices (EPLD), electrically erasable programmable logic device (EEPLD), and field programmable gate array (FPGA). Factory programmed devices include but are not limited to application specific standard product (ASSP), application specific integrated circuit (ASIC), and standard cell array, just to name a few. Programmable and factory programmed devices can have internal logic, assuming the functions of the bit event logic, and integrated SerDes resulting in more-compact and lower-cost solutions.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as a computer readable medium having program instructions. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for optimizing a circuit design tool, the method comprising:
   receiving a circuit design file;
   detecting a pragma in the circuit design file, wherein the pragma includes circuit type information for a functional block in the circuit design file, and wherein the pragma appears in the circuit design file as a comment;
   applying a first algorithm in response to the detecting the pragma, wherein the first algorithm is configured to perform one of a synthesis or a timing analysis for the functional block, and wherein the first algorithm is different from a second algorithm applied to the functional block if the pragma is undetected; and
   generating a circuit design for implementation in an electronic device, wherein at least one method operation is executed by a processor.

2. The method of claim 1 further comprising:
   outputting one or more warnings if the functional block in the circuit design file is inconsistent with the circuit type information in the pragma.

3. The method of claim 1, wherein the circuit type information indicates a bus arbiter, wherein the first algorithm performs the synthesis, wherein the pragma includes a plurality of request lines and a plurality of grant lines, and wherein the method further includes:
  outputting a warning if at least one request line is unutilized in the generated circuit design.

4. The method of claim 1, wherein the circuit design file includes HDL source code.

5. The method of claim 1, wherein the circuit type information is selected from a group consisting of a Cyclic Redundancy Check (CRC), a bus arbiter, a state machine encoder, a barrel shifter, a preferential core, and a legacy circuit.

6. The method of claim 1, wherein the pragma is generated by the circuit design tool in response to an analysis of HDL source code.

7. The method of claim 1, wherein the pragma includes circuit type parameters.

8. The method of claim 1, wherein the circuit type information indicates a Cyclic Redundancy Check (CRC), wherein the pragma includes a polynomial, a number of data bits, and a number of CRC bits, and wherein the generating the circuit design further comprises:
  creating an initial CRC circuit using the polynomial;
  checking if the initial CRC circuit complies with the pragma and a design entered into the circuit design tool;
  generating a warning and calculating a new polynomial based on the design entered into the circuit design tool in response to the checking; and
  generating a circuit design using a premade method during synthesis based on one of the polynomial in the pragma or the calculated new polynomial.

9. The method of claim 1, further including entering the pragma in the circuit design file by one of:
  embedding the pragma in an HDL source file;
  writing the pragma in an external file to the HDL source file; or
  storing pragma equivalent information in existing node assignment mechanisms.

10. The method of claim wherein the applying the first algorithm includes selecting the first algorithm from a plurality of potential algorithms for the circuit type information in the pragma.

11. The method of claim 1, wherein the circuit type information indicates a preferential core, and wherein the first algorithm performs the timing analysis of the preferential core.

12. The method of claim 11, wherein the timing analysis of the preferential core is optimized by applying preferential timing annotations to reduce delays associated with the preferential core.

13. The method of claim 12, wherein the preferential timing annotations are applied to all intervening delays between two registers in the preferential core.

14. The method of claim 11 further comprising:
  applying different levels of preferential treatment for different preferential core circuits based on information in the pragma.

15. A non-transitory computer readable medium having a circuit design tool with program instructions that when executed by a computer implements a method for optimizing circuit design, said method comprising:
  receiving a circuit design file by the computer;
  detecting a pragma in the circuit design file, wherein the pragma includes circuit type information for a functional block in the circuit design file, and wherein the pragma appears in the circuit design file as a comment;
  applying a first algorithm in response to the detecting the pragma, wherein the first algorithm performs one of a synthesis or a timing analysis for the functional block, and wherein the first algorithm is different from a second algorithm applied for the functional block if the pragma is undetected; and
  generating a circuit design utilizing the first algorithm.

16. The non-transitory computer readable medium of claim 15, wherein the circuit design file includes HDL source code.

17. The non-transitory computer readable medium of claim 15, wherein the pragma is generated by the circuit design tool in response to an analysis of HDL source code.

18. The non-transitory computer readable medium of claim 15, wherein the pragma includes pragma parameters selected from a group consisting of variable names associated with block input and output signals, polynomials associated with error correction or detection, and intended widths of multiple bit signals within a circuit block.

19. The non-transitory computer readable medium of claim 15, wherein the circuit type information indicates a preferential core circuit, and wherein the timing analysis of the preferential core circuit is optimized by applying preferential timing annotations to reduce delays associated with the preferential core circuit.

20. The non-transitory computer readable medium of claim 19, wherein the preferential timing annotations are applied to all intervening delays between two registers in the preferential core circuit.

21. A system for designing circuits, the system comprising:
  a bus;
  a memory; and
  a processor coupled to the memory through the bus, the processor being operable to receive instructions from the memory which, when executed by the processor, cause the processor to perform a method comprising:
    receiving a circuit design file;
    checking the received circuit design file for an input pragma, wherein the input pragma includes circuit type information for a functional block in the circuit design file, and wherein the pragma appears in the circuit design file as a comment;
    determining one of a heuristic algorithm if the input pragma is absent from the circuit design file or a first algorithm if the input pragma is present in the circuit design file; and
  generating a circuit design using one of the first algorithm or the heuristic algorithm in response to the determining.

22. The system of claim 21 further comprising:
  a display operable to output warnings if the functional block in the circuit design file is inconsistent with the circuit type information in the input pragma.

23. The system of claim 21 further comprising:
  a non-volatile memory, wherein the processor is operable to store the generated circuit design in the non-volatile memory, and wherein the electronic device is a programmable logic device (PLD).

24. The system of claim 21, wherein the input pragma includes pragma parameters selected from a group consisting of variable names associated with block input and output signals, polynomials associated with error correction or detection, and intended widths of multiple bit signals within a circuit block.

25. The system of claim 21, wherein the circuit type information indicates a preferential core circuit, and wherein timing analysis of the preferential core circuit is optimized by applying preferential timing annotations to reduce delays associated with the preferential core circuit.

26. The system of claim 25, wherein the preferential core circuit is one of:
 a Peripheral Component Interconnect (PCI) Express interface;
 a Double Data Rate (DDR) memory controller;
 a Serial RapidIO interface;
 an Ethernet Media Access Control (MAC) interface; or
 an Interlaken interface.

* * * * *